US008724484B2

(12) United States Patent
Jones et al.

(10) Patent No.: US 8,724,484 B2
(45) Date of Patent: May 13, 2014

(54) CONNECTING TO DIFFERENT NETWORK TYPES THROUGH A COMMON USER INTERFACE

(75) Inventors: David Jones, Seattle, WA (US); Srinivas Raghu Gatta, Redmond, WA (US); Marieke I. Watson, Redmond, WA (US); Aaron W. Cunningham, Redmond, WA (US); Rahul Chandran, Bellevue, WA (US); Savas Guven, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1633 days.

(21) Appl. No.: 11/447,540

(22) Filed: Jun. 5, 2006

(65) Prior Publication Data

US 2007/0067446 A1 Mar. 22, 2007

Related U.S. Application Data

(60) Provisional application No. 60/717,703, filed on Sep. 16, 2005.

(51) Int. Cl.
*H04L 12/28* (2006.01)
*G06F 15/173* (2006.01)
*H04L 12/24* (2006.01)
*H04L 29/08* (2006.01)

(52) U.S. Cl.
CPC ............... *H04L 41/22* (2013.01); *H04L 67/36* (2013.01)
USPC ............................ 370/252; 370/401; 709/223

(58) Field of Classification Search
USPC ......... 709/203, 225, 226, 224; 455/513, 13.1; 370/328, 400, 338
See application file for complete search history.

(56) References Cited

U.S. PATENT DOCUMENTS

| 6,587,433 | B1 * | 7/2003 | Borella et al. ................. 370/230 |
| 6,647,409 | B1 | 11/2003 | Sherman |
| 6,665,720 | B1 | 12/2003 | Willis et al. |
| 7,483,984 | B1 * | 1/2009 | Jonker et al. .................. 709/226 |
| 2001/0005849 | A1 | 6/2001 | Boothby |
| 2002/0176366 | A1 * | 11/2002 | Ayyagari et al. .............. 370/245 |
| 2003/0100308 | A1 | 5/2003 | Rusch |
| 2003/0172118 | A1 | 9/2003 | Bilansky |

(Continued)

FOREIGN PATENT DOCUMENTS

| CN | 1618208 | 5/2005 |
| CN | 1630234 | 6/2005 |

(Continued)

*Primary Examiner* — Marcus R Smith
(74) *Attorney, Agent, or Firm* — Andrew Sanders; Alin Corie; Micky Minhas

(57) ABSTRACT

Described is a technology by which network connections are unified into a single user interface for user interaction with those networks. Upon receiving information identifying available networks that correspond to different types of media, a user interface component aggregates the available network connections and displays representations of the available network connections on the user interface. The result is a single user interface page on which the available networks are represented as available network connections that may correspond to destinations, for example by displaying a network name and/or a user-friendly name maintained in a network profile. Also displayable is connectivity status, security-related information, signal strength information for wireless network connections, and other information. The user may choose to show all available network connections, or only subset of the available network connections (e.g., only wireless, or only dial-up and VPN).

20 Claims, 10 Drawing Sheets

(56) References Cited

U.S. PATENT DOCUMENTS

| | | |
|---|---|---|
| 2004/0003060 A1* | 1/2004 | Asoh et al. .................... 709/220 |
| 2004/0077341 A1* | 4/2004 | Chandranmenon et al. .. 455/418 |
| 2004/0220958 A1 | 11/2004 | Kenyon et al. |
| 2005/0091357 A1 | 4/2005 | Krantz et al. |
| 2005/0198287 A1* | 9/2005 | Sauve et al. .................... 709/225 |
| 2005/0233744 A1* | 10/2005 | Karaoguz et al. ........... 455/432.3 |
| 2006/0264227 A1* | 11/2006 | Takahashi et al. ............ 455/513 |

FOREIGN PATENT DOCUMENTS

| | | |
|---|---|---|
| EP | 138535 | 1/2004 |
| EP | 1385351 A1 * | 1/2004 |
| EP | 1396976 | 3/2004 |
| JP | 2000259312 | 9/2000 |
| JP | 2001-523859 | 11/2001 |
| JP | 2004-214934 | 7/2004 |
| JP | 2004272563 | 9/2004 |
| KR | 2004-0080994 | 9/2004 |
| WO | WO99/26147 | 5/1999 |
| WO | WO 0135585 | 5/2001 |
| WO | WO2004031488 | 4/2004 |
| WO | WO2005039112 | 4/2005 |
| WO | WO2005057860 | 6/2005 |

* cited by examiner

CONNECTING TO DIFFERENT NETWORK TYPES THROUGH A COMMON USER INTERFACE

CROSS REFERENCE TO RELATED APPLICATION

The present invention claims priority to U.S. provisional patent application Ser. No. 60/717,703, filed Sep. 16, 2005, which is hereby incorporated by reference.

BACKGROUND

In contemporary computer systems and networking, computer users view networks from the perspective of the network source, e.g., what the user needs to do to make a connection. For example, a host machine typically has one or more network interface cards (NICs), each of which provides a different type of connectivity corresponding to a network connection.

In general, each of these types of network connections provides its own user experience. For example, in Microsoft Corporation's Windows® XP operating system, there are separate user interfaces for remote access service (RAS) dial-up connections, RAS PPPoE (Point-to-Point Protocol over Ethernet) connections, RAS VPN (virtual private network) connections, RAS connection manger dial-up/VPN connections, wireless 802.11 connections, wireless wide area network connections (e.g., GSM/CDMA), Wi-Max 802.16 connections, and Bluetooth® personal area network connections. Moreover, the user typically had to go to different places to locate the user interface to connect to each one, and each user interface tended to work differently from the others.

As computing in general becomes more service oriented, the user's various network connections can be considered a service with a multitude of providers. Many users are confused and frustrated when dealing with network connections, because in general the current user interface model of having different user interfaces for different network connections does not match a service-oriented, network destination computing model.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which network connections are unified into a single user interface for user interaction with those networks. An aggregator obtains network related information from a plurality of media modules, including media modules corresponding to different types of network. A user interface component coupled to (or part of) the aggregator component displays representations of available network connections for different network types at a common interactive page.

To this end, upon receiving information identifying available networks that correspond to different types of media, a user interface component and/or the aggregator aggregates the available network connections and displays representations of the available network connections on the user interface. The result is a single user interface page on which the available networks are represented as available network connections that may correspond to destinations, for example by displaying a network name and/or a user-friendly name maintained in a network profile. Also displayable is connectivity status, security-related information, signal strength information for wireless network connections, and other information.

By interacting with the page, the user may connect to or disconnect from any available network. As other examples of interaction, the user may choose to show all available network connections, or only subset of the available network connections (e.g., only wireless, or only dial-up and VPN), or obtain additional information by interacting with the page.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
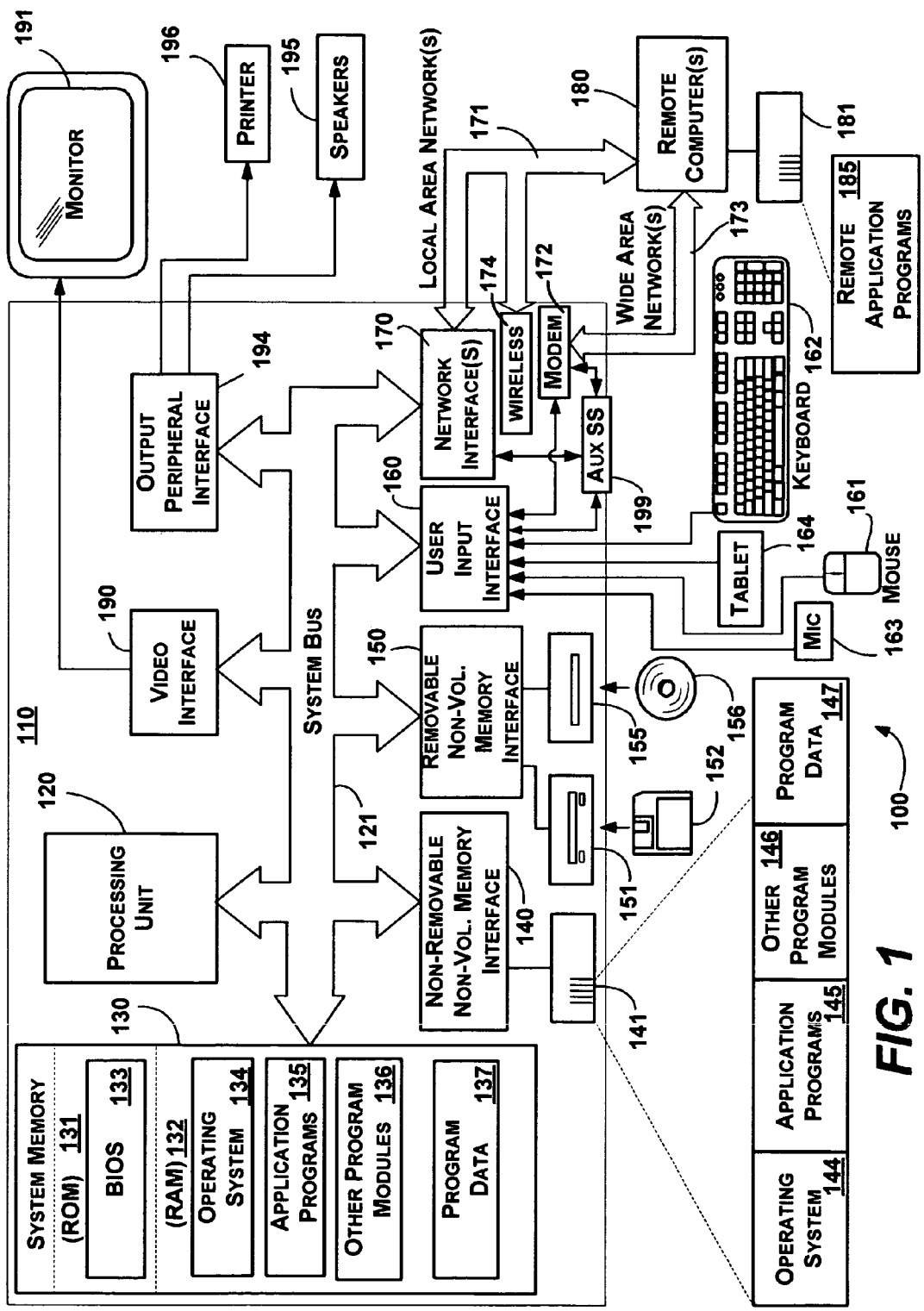
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. However, computer storage media does not include carrier waves or signals. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include one or more local area networks (LAN) 171 and one or more wide area networks (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. A wireless networking component 174 such as comprising an interface and antenna may be coupled through a suitable device such as an access point or peer computer to a WAN or LAN. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Connecting to Different Network Types

Various aspects of the technology described herein are directed towards representing networks in a new way that facilitates a user's ability to selectively connect to those networks. In one general aspect, each media reports the network or networks that are currently connectable through that media's interface, and a user interface aggregates the networks for presenting to a user, whereby the user may intuitively select a network based on the media type. For example, if the user's computer has wireless media capabilities, a dial-up modem and an Ethernet connection, a main user interface page may present wireless networks, dial-up networks and an Ethernet wired broadband network; the user can connect to a selected network via the main user interface page. Moreover, the network connections may be presented with a friendly, destination-based name, such as "work," "meeting" and so forth. The main user interface page exemplified herein also serves as a mechanism for showing modified user interface pages, such as a page that only shows wireless networks, or one that only shows dial-up and VPN networks. Note that as used herein, the term "page" is not limited to any particular type of visible output, but instead refers to any display output that can be interacted with via a pointing device or the like, including windows, HTML-based pages or the like, program windows, and so forth.

As will be understood, however, the various aspects described herein are not limited to any particular concepts or examples. For example, one architecture exemplified herein is extensible to handle future network connections, beyond those currently implemented, and thus the various network connections shown herein are only non-limiting examples. Similarly, the user interface displays shown herein are only examples. As such, any of the examples, structures or functionalities described herein are non-limiting, and the present invention may be used various ways that provide benefits and advantages in computing, data communication, programs, and networking in general.

Figure 2:
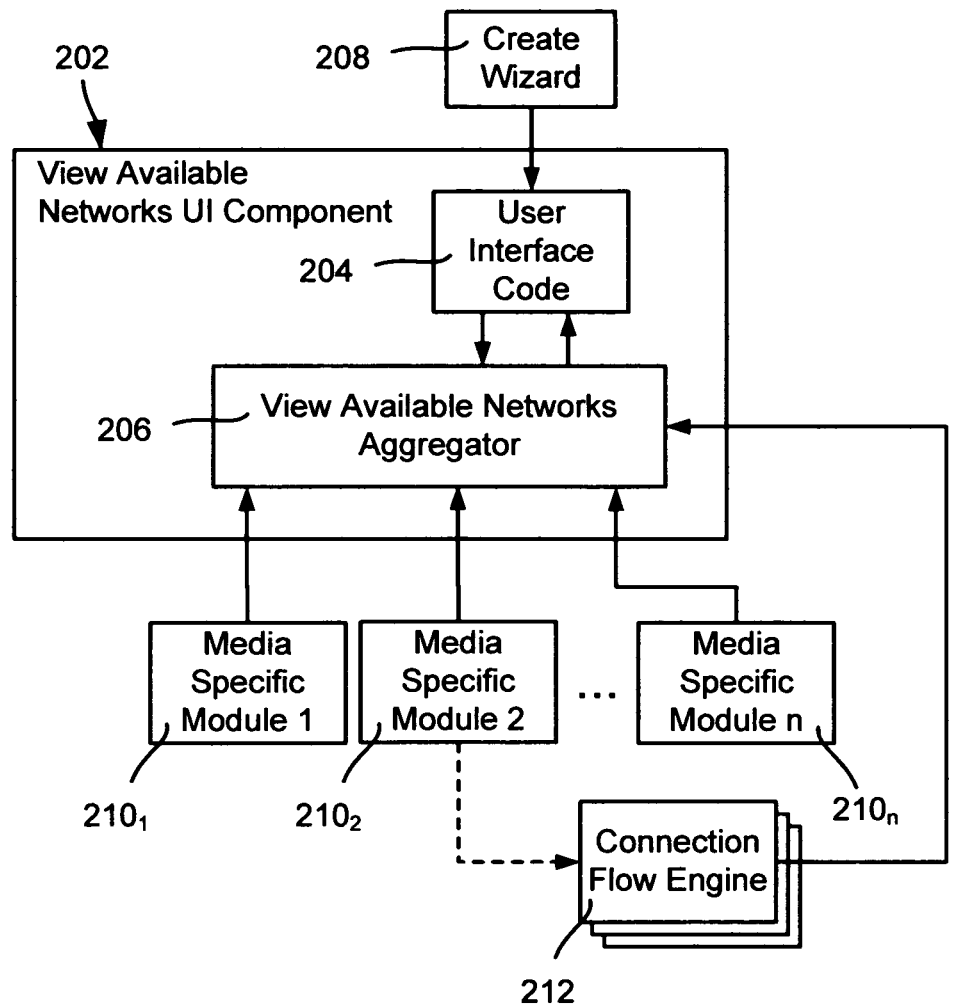
FIG. 2 is a representation of an example architecture for displaying and/or enabling connection to different network types through a common user interface.

FIG. 2 conceptually represents a user interface and architecture that makes it easier for users to connect to different networks, including by grouping separate connections into groups of networks whereby a user no longer needs to understand which connection to select when connecting to a particular network destination. For example, if a user selects a network named "work," the underlying architecture will automatically connect the appropriate connection. This includes disconnecting other networks as necessary. For the user, the user interface changes the focus from connection (source)-based networking to destination-based networking, thus simplifying network connections.

In FIG. 2, a view available networks component 200 includes user interface code 204 and an aggregator 206. The user may use a wizard 208 or the like to construct an appropriate user interface for a given computer system and the user's networks. Note that the view available networks page that results is sometimes alternatively referred to as a quick connect dialog.

The aggregator 206 pulls together the various network connection data by working with media specific modules $210_1$-$210_n$, such as one for wireless media, one for RAS media and so forth. In general, in one implementation each media type has its own media module that plugs into the aggregator 206, such as by using well-known component object model (COM) technology to connect COM objects. Note that each module also informs the aggregator 206 when connected to a network.

In turn, each module (e.g., module $210_2$) is associated with at least one connection flow engine 212, and there is a connection flow engine for each connection type, e.g., there is a connection flow engine for RAS, and within that connection flow engine for RAS is another connection flow engine for dialup, another for PPPoE, another for VPN, and so forth. In general, the connection flow engines contain logic for performing operations and updating the aggregator 206, e.g., what actions to take when the user clicks connect, what to aggregate, how to modify the main user interface page, what actions to take when the user clicks disconnect, and so forth. Note that this connection flow engine model facilitates extensibility, in that, for example, a third party vendor can supply a connection flow engine and update the user interface as a frame with new content or pages, rather than provide a separate set of dialogs for a new connection type.

Figure 3:
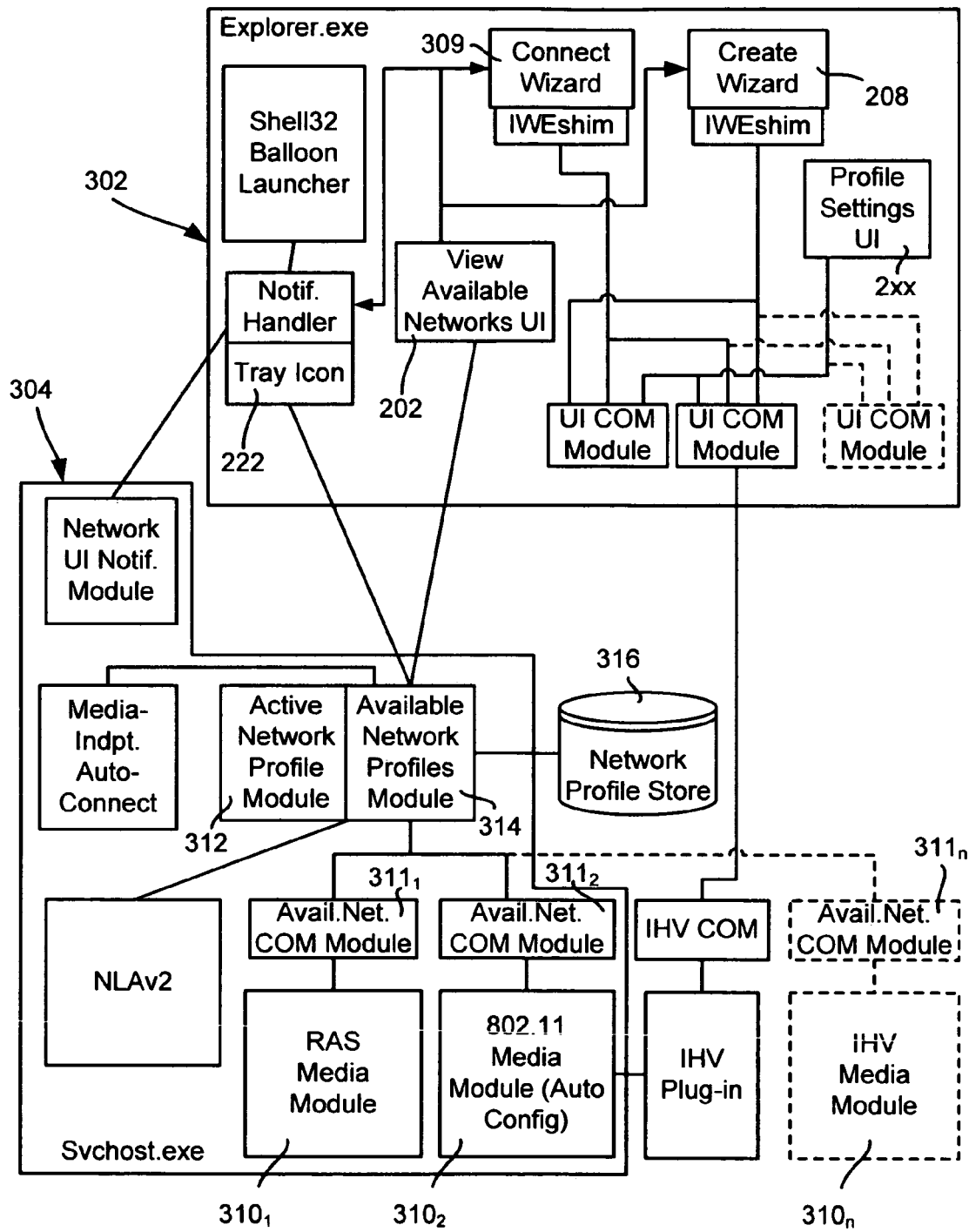
FIG. 3 is a representation of example components for displaying and/or enabling connection to different network types through a common user interface.
Figure 4:
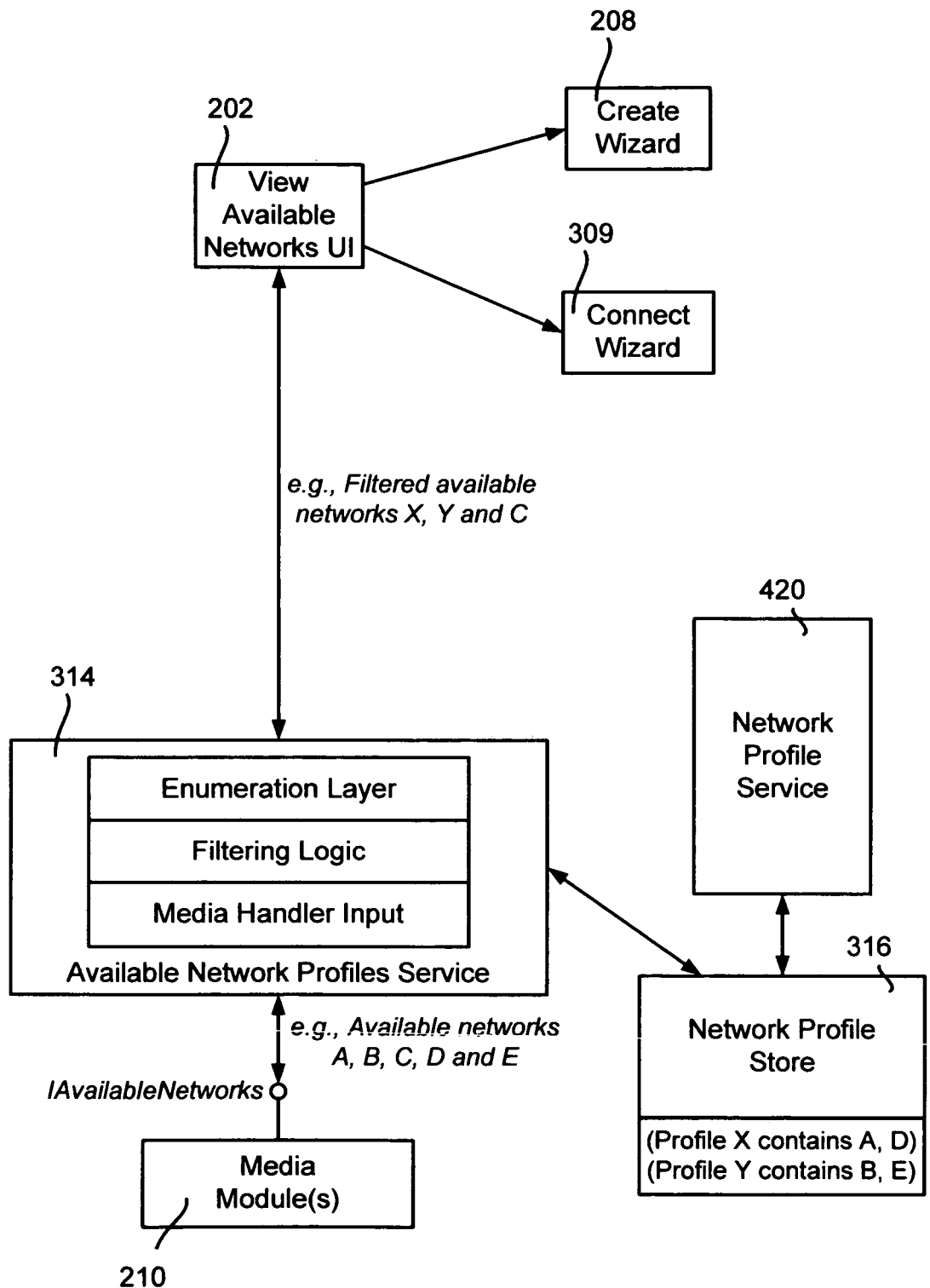
FIG. 4 is a representation of using profile information and filtering to selectively display available network information.

FIG. 3 exemplifies a more specific example network connect architecture, and FIG. 4 shows an available network profile service architecture for networks to which the user has previously connected or configured and wants information maintained for such networks. Note that while in general, the network connect architecture of FIG. 3 is directed towards collecting current network information and providing that information to user interface components, FIG. 3 also includes network profile concepts.

In one example implementation, the view available user interface component 202 is included as part of a program 302 (e.g., an operating system component) by which a user interacts with other operating system components and the like, e.g., explorer.exe in a Windows®-based operating system as represented in FIG. 3. Note that a connect wizard 309 is represented in FIG. 3, e.g., for connecting to previously-created network connections. Another set of network-related components including the media modules $310_1$ and $310_2$ are contained within another network service program 304, (e.g., another operating system component), e.g., svchost.exe. As can be readily appreciated, however, there is no requirement that the components be arranged in the example manner shown in FIG. 3, and indeed, there may be only one program that performs all of the operations that the components perform, or any practical number of fewer or more additional components that perform the operations described herein; moreover, any such components may be separated or combined in virtually any way.

In general, and as described above, the user interface components 302 obtain information from the network service program 304 as to which networks are currently available with respect to being able to make a connection. Note that in FIG. 3 the media modules are indirectly coupled to the view available networks UI component 202, e.g., via active and available network profile modules 312 and 314, respectively, to allow for filtering at this service level as to which networks are active and which are available, including those having information maintained therefor in a network profile store 316. For example, the view available networks UI component 202 may be an in-process COM module, with other modules also loaded in-process. Each media module $310_1$-$310_n$ may communicate with their respective services (e.g., available network COM modules $310_1$-$310_n$) through some out-of-process method of their own choosing.

Note that availability depends on various criteria, including the type of media components currently installed in the computer system, e.g., wireless NIC, Ethernet NIC, dial-up modem and so forth, as well as where the user is located and what is available, e.g., whether any wireless networks are detected, whether there is a LAN connection, and so forth.

FIG. 4 shows an example concept of profiles and filtering in more detail. The wizards and/or a user may interact with the network profile store 316 via a network profile service 420, to do things like give a friendly name to a network. The media modules 210 report network availability to the available network profiles service (e.g., over an IAvailableNetworks interface), where the availability information is then processed in conjunction with the network profile store data to filter out unavailable networks and/or report profiles for available networks when a network or networks for a profile are available. Thus, in the example of FIG. 4, networks A-E are available, and what is filtered and reported to the view available networks UI is network C, profile X which contains networks A and D, and profile Y which contains networks B and E.

Figure 5:
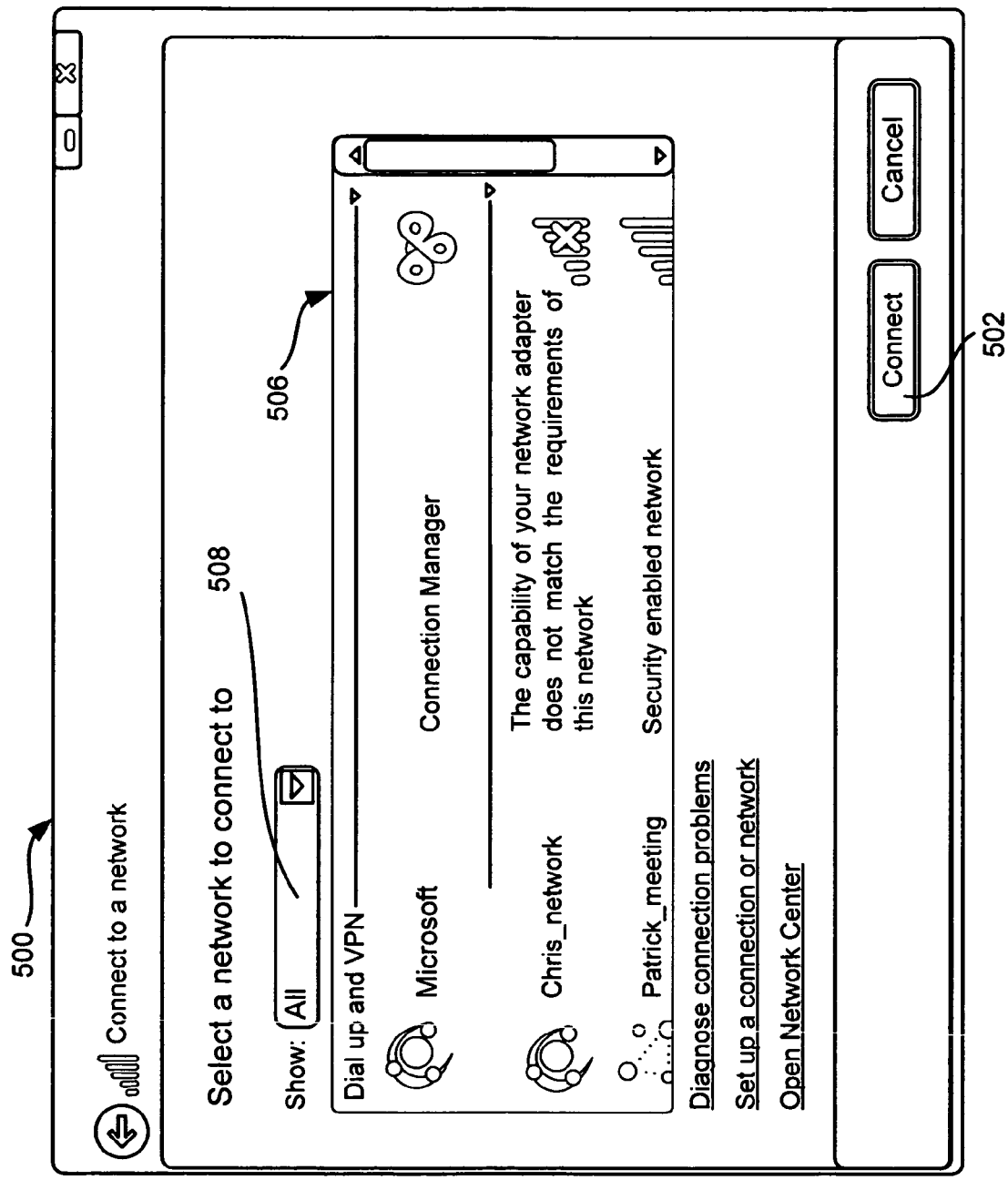
FIGS. 5-10 are representations of a user interface page in various states as controlled by user interaction and network availability and events.

To simplify a user's networking experience, FIG. 5 shows an exemplary user interface page 500, which along with the structure and functionality described with reference to FIG. 2-4 facilitate connections, essentially by unifying the various available networking connection into the single user interface page 500. The page 500 serves as a main entry point for connecting to a new or existing network.

As described above, although not required to implement the view available networks UI interface 500, to simplify the connection experience and to give it a more unified feel, the UI page 500 may be built and operated using a wizard framework, e.g., comprising the create wizard 208 and connect wizard 209. As can be readily appreciated, such a wizard framework allows the connection experience to flow essentially seamlessly from the view available networks UI page 500 to individual connection pages, giving a user a consistent look and feel along with a better understanding of where the user is in a given connection process.

As also described above, information on available networks may include available network profile information and data on profile constituents. Thus, the view available networks UI 500 may be configured to provide a single entry point for the user to view network destinations, that is, the view available networks UI page 500 may display available network profiles along with available networks. Further, as described below, the view available networks UI page 500 may be used to view subsets of this information, such as all wireless networks, all ad hoc networks, or all Wi-Max networks, and so forth.

By incorporating the above aspects, the view available networks UI component 202 thus provides the centralized connection UI page 500 for essentially all connections, as well as network profile types. This includes presenting users with a single interface for existing network types, as well as future types not currently implemented, (e.g., Wireless Wide Area Networking or WWAN, Wi-Max, and the like). To this end, the example user interface is extensible, in that third parties (e.g., independent hardware vendors, or IHVs in FIG. 3) may plug in new media types, and have them display as either available networks or plug into a network profile. This avoids the problem of having users learn multiple connection experiences or install/learn third party clients, instead using the same UI page 500 to simply and easily connect to networks.

As can be seen in the example of FIG. 5, the view available networks UI page 500 provides a simple way for users to select and connect (e.g., via a button 502) to a network. The page 500 may display (via scrolling as necessary) all available networks profiles from the network profile store 316, such as wireless networks profiles, Ethernet connections (e.g., derived from NLAv2 signatures), RAS dial-up, VPN & CM connections, available infrastructure networks (e.g., 802.11 wireless), available ad-hoc networks (e.g., 802.11 wireless). Available WWAN networks (e.g., GSM/CDMA) may also be presented, and may correspond to data network types for GPRS, EDGE, UMTS, HSDPA, 1xRTT, 1xEV-DO, 1xEV-DV, as well as future supported data types.

As also shown, the page 500 may include additional attributes, including that that a user can easily identify a network, a user can easily identify the security status of a network, and a user can easily identify which networks are currently connected or available. Links to diagnostic and other useful information may be provided.

For example, the network list area 506 contains a list of all networks that were visible at the time the dialog was opened, or when list was last refreshed. The list area 506 may display an icon for each network, a customized network profile icon (from the profile service), a customized wireless icon (e.g., from a WISP provider), a default wireless icon (new 802.11 wireless networks), a default ad hoc wireless icon (new ad-hoc 802.11 wireless networks), a customized WWAN Icon (e.g., from a cellular provider), a customized Wi-Max icon (e.g., from a Wi-Max provider), and default icons for UWB, Bluetooth® PAN, RAS dial-up, RAS VPN, RAS CM and/or RAS PPPoE. In one example implementation, the framework allows for networks to appear or disappear via an auto-update/notification mechanism.

The exemplified network list 506 also may display a name for each network in the list, including a network profile name (from the network profile service 316), an SSID (service set identification information) for new available 802.11 wireless networks (e.g., ad hoc/infra), the SSSID (the friendly name for WPS networks from a WISP provider), and connection names for RAS dial-up, VPN, CM & PPPoE connections.

Figure 6:
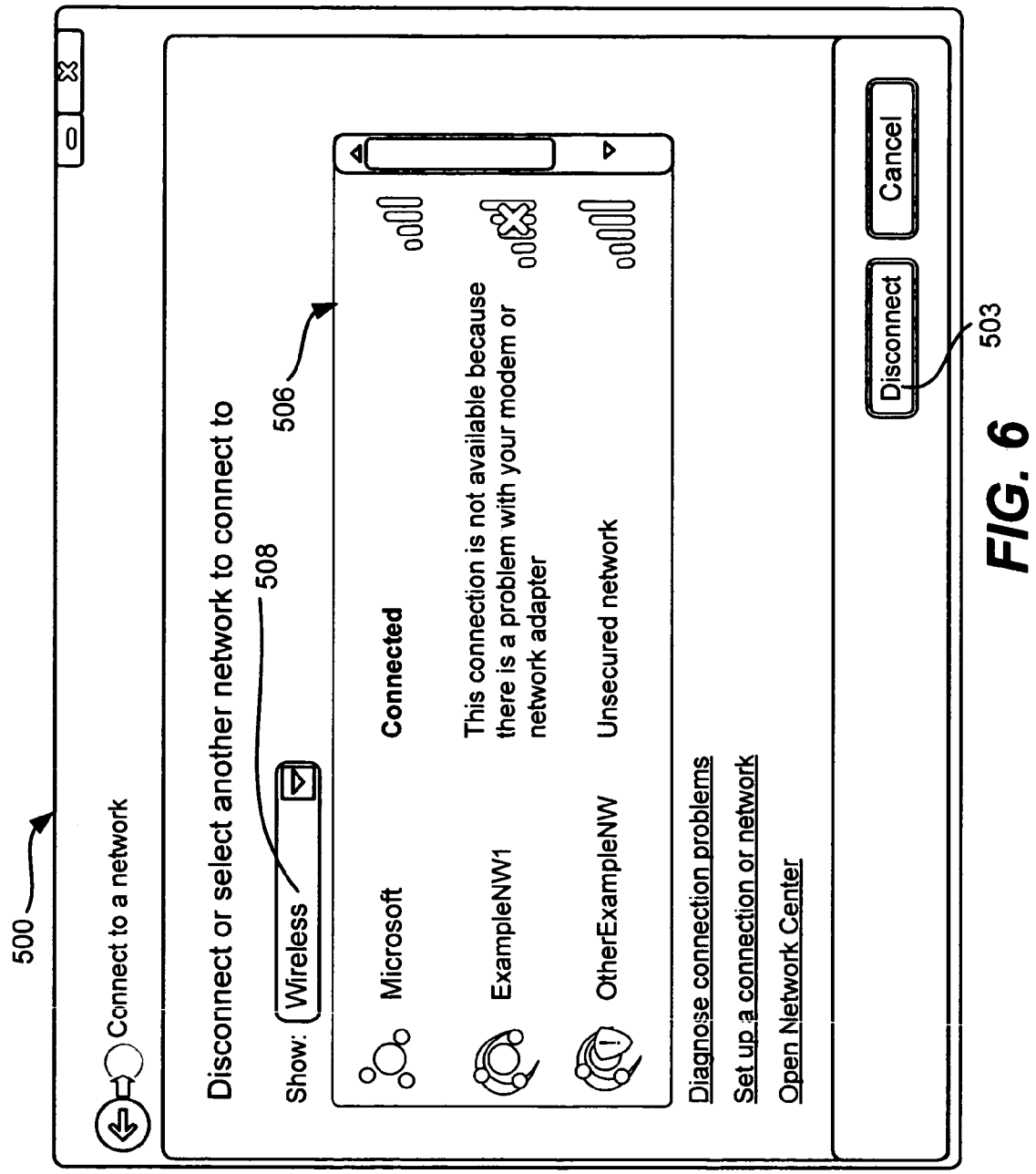
Figure 7:
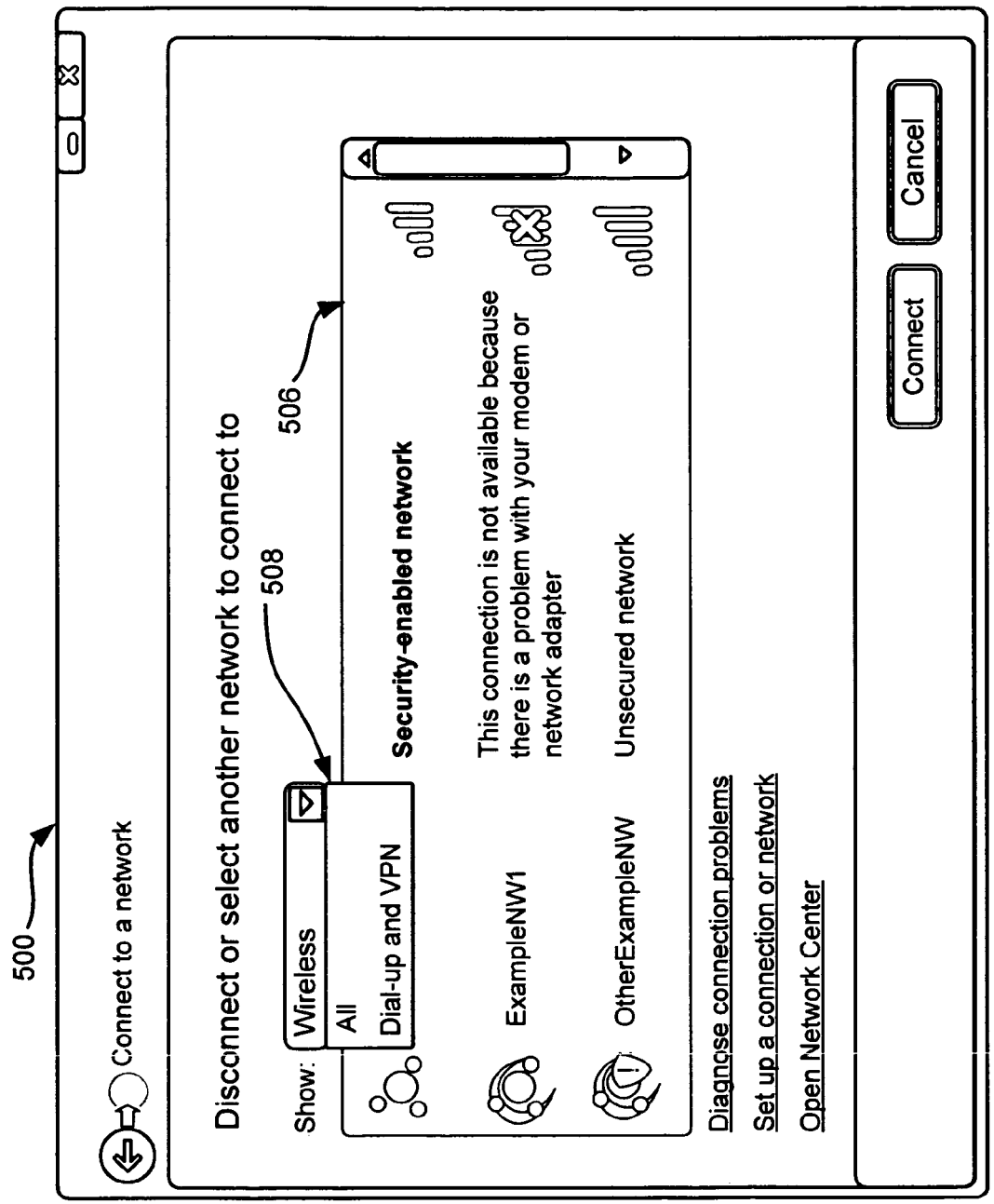

As represented in FIG. 6, if the device is currently connected to a network, the text "Connected" (or other suitable state message) is displayed next to that network. Note that FIG. 6 also shows a subset of the available networks being displayed, e.g., the user has chosen to display only wireless connections via a drop down list 508 (FIG. 7).

In one implementation, the network (or networks) that is connected are displayed at the top of the list area 506, regardless of type. For a consistent user experience, other ordering rules may be used for displaying items in the network list, such as to list networks that are in the profile store above those that are not, and for the networks in the profile store list, the order in the list is used to order the visible network list (e.g., a network higher in the profile store list appears higher in the visible network list). Note that in one implementation, the ordering rules are decided at a media manager level, (e.g., shown as media manager module(s) $310_1$-$310_n$ of FIG. 3) and then by the view available networks UI 202. For example, the media manager level provides the view available networks UI 202 with an order based on defined ordering rules, which the view available networks UI 202 can reorder based upon other information, e.g., with the connected network or networks ordered to appear at the top of the list 506, but retaining the other order. Notwithstanding, the ordering can be performed at any level or combination of levels, including in the available network profiles service, and also may be overridden, e.g., by user preference data.

If a network is not in the profile store list, the following order may be used, namely that WPS networks that are not in the profile store list are displayed before other non-profile store list networks, and within the list of WPS networks ordering is dependent on the order the underlying AP is found and the order of the networks stored in the provisioning service (this should persist the order that was downloaded from the network, if more than one network).

Infrastructure networks not in the preferred list are displayed before ad-hoc networks. Within the list of infrastructure networks, ordering is dependent on the order that the wireless auto-configuration service discovers them. Ad-hoc networks not in the profile store list are displayed last. Within the list of ad-hoc networks, ordering is dependent on the order that the wireless auto-configuration service discovers them. Next (for those that are not part of a network profile) are any RAS PPPoE connections, followed by RAS CM connections, RAS VPN connections and RAS Dial-up connections.

The security status may be displayed for each network (e.g., security enabled, unsecured) and/or other appropriate text (e.g., showing diagnostic-type information such as a capability mismatch) is displayed when not connected. For each network shown in the list, the signal strength (if available and appropriate) of each network, as is an icon for the type of connection available (e.g., VPN) as determined from the profile service.

Figure 8:
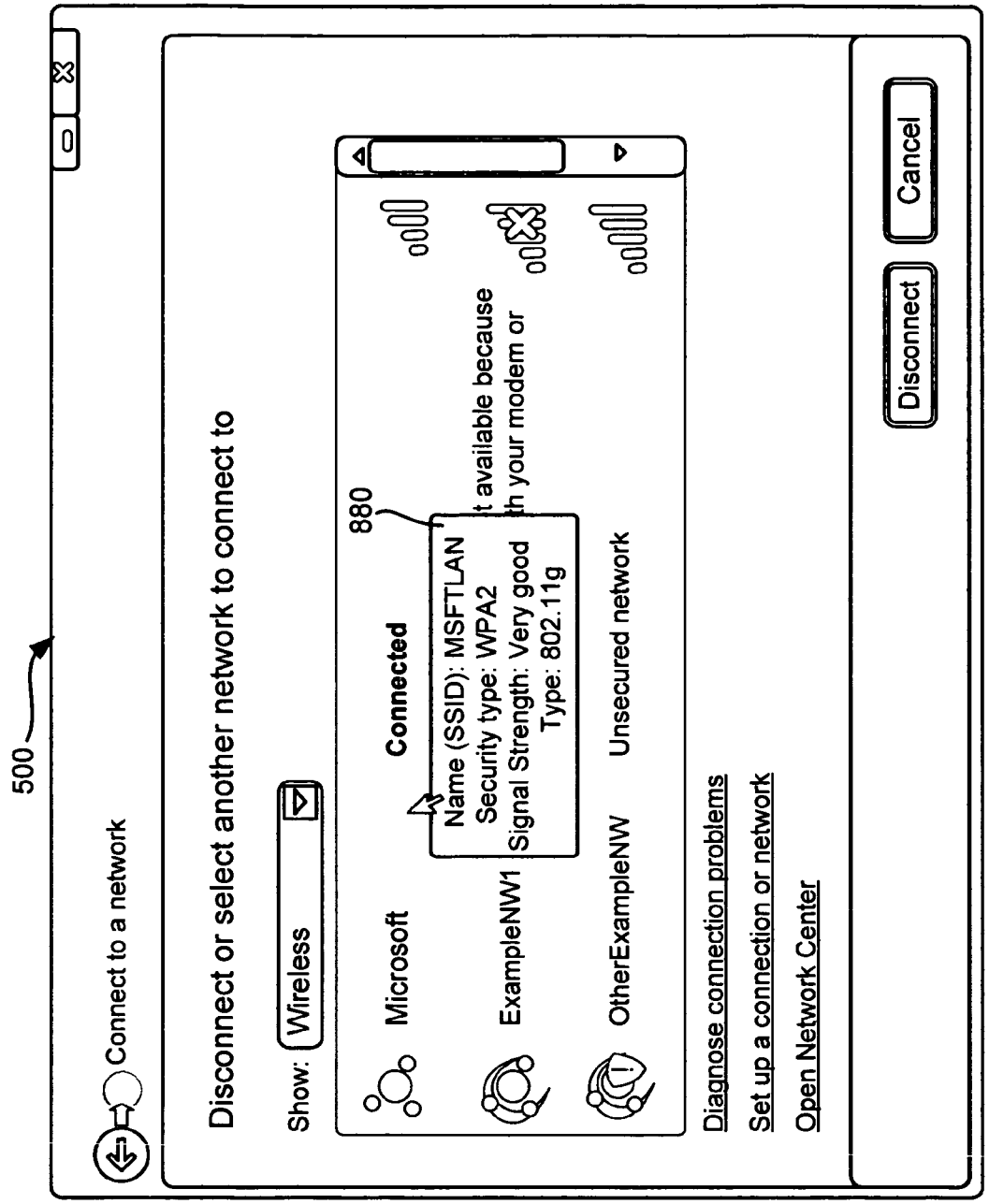

FIG. 8 shows how additional information may be provided on hover. For example, depending on the network type, if the user hovers over an individual entry the user can view a tool tip, e.g., for wireless networks, SSID, security type, radio type, signal strength, and possibly other information may be shown, whereas for WWAN, network name, signal strength, roaming status and possibly other information may be shown. Hovering over Wi-Max will show SSID, Security type, signal strength possibly other information, while hovering over a Bluetooth PAN network will show network name and possibly other information. Hovering over a VPN or dial-up may show connection name and connection duration, while an Ethernet may show adapter name, connection duration, speed, and so forth.

Figure 9:
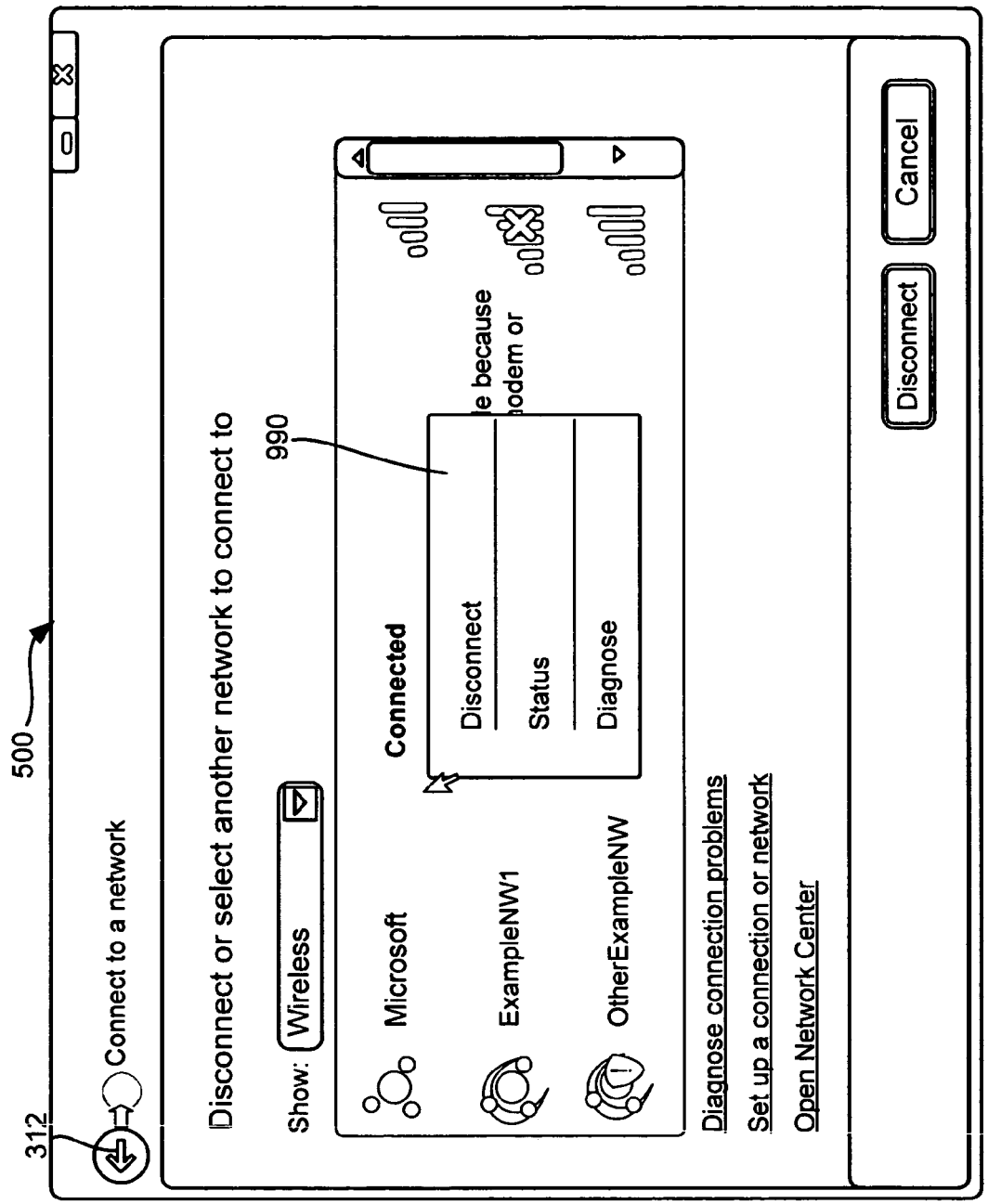
Figure 10:
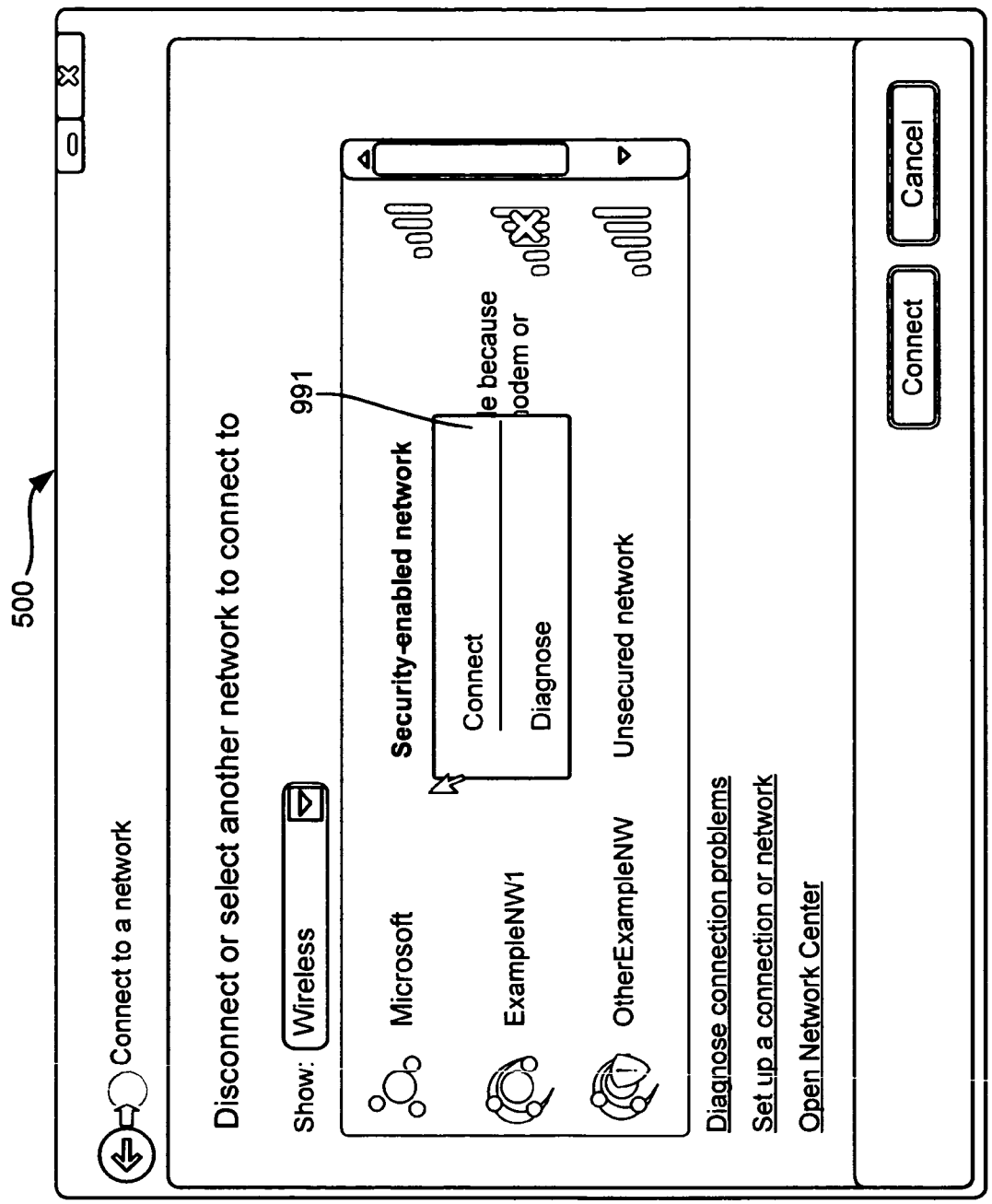

FIGS. 9 and 10 show a right-click (or possibly keyboard initiated, left click or double-click) alternative way to connect (FIG. 9) and disconnect (FIG. 10) to and from a network when the mouse pointer is positioned over that network. Note that other ways of connecting and/or disconnecting from a network (e.g., via a system tray icon component 222, FIG. 2) are also feasible.

As shown in FIGS. 9 and 10, the "Connect" option switches out the list of profiles to display a list of connections that are contained within the selected profile. This allows a user to connect/disconnect an individual connection. Note that in one example implementation, this only appears on network profiles and only when it contains more than one connection. A diagnose option may appear, such that if there is a problem with any of the connections in the profile, this option will show and when clicked will initiate diagnostics. A turn off Wireless option may appear, to turns off the 802.11 wireless, 802.16 (Wi-Max), WWAN, UWB, Bluetooth PAN radios As can be readily appreciated, because in one implementation the connection processes are built using a wizard framework or the like, the connection dialogs can be kept in a page, that is, in frame. This creates a consistent connection experience for the user, as the page may be modified and/or new pages can be swapped in as required. This also allows for seamless extensibility, as a third party can create a page or pages that fit into the existing flow.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment in which a computing device is capable of connecting to networks, a method for grouping a plurality of different types of network connections by destination within a graphical user interface, the method comprising:
  identifying a plurality of network profiles, each network profile including (i) an identification of a corresponding different network destination and (ii) a specification of one or more network connections that can be used to connect to the corresponding different network destination, the plurality of network profiles including:
    a first network profile that includes (i) an identification of a first network destination, and (ii) a specification of a first combination of network connections that can be used to connect to the first network destination, wherein the first combination of network connections includes a first combination of one or more wireless network connections and one or more wired network connections; and
    a second network profile that includes (i) an identification of a second network destination, and (ii) a specification of a second combination of a plurality of different types of network connections that can be used to connect to the second network destination, wherein the second combination of network connections includes a second combination of one or more wireless network connections and one or more wired network connections;
  determining which of the plurality of network destinations are currently available for connection, including (i) determining that the first network destination is available for connection based on at least one network connection of the first combination network connections being available, and (ii) determining that the second network destination is unavailable for connection based on no network connection of the second combination network connections being available;
  displaying a common graphical user interface for grouping a plurality of different types of network connections by destination, including displaying a representation of each corresponding different network destination, while also displaying a status for each corresponding different network destination, including displaying an available status of the first network destination and concurrently displaying an unavailable status of the second network destination;

receiving user input at the common graphical user interface selecting the first network destination; and based on the user input, automatically selecting a particular network connection from the first combination of network connections, and connecting to the first network destination using the particular network connection.

2. The method of claim 1, wherein displaying a representation of each corresponding different network destination comprises displaying each representation in an order that is based upon ordering rules, including displaying any connected network destination before any non-connected available network destination.

3. The method of claim 2, further comprising deciding at least part of the order at a media manager level according to the ordering rules.

4. The method of claim 1, wherein displaying a representation of each corresponding different network destination comprises displaying a network name and/or a user-friendly name for each network destination.

5. The method of claim 1, wherein displaying a representation of each corresponding different network destination comprises displaying security-related information for at least one network destination.

6. The method of claim 1, wherein displaying a representation of each corresponding different network destination comprises displaying wireless signal strength information in connection with a least at least one network destination.

7. The method of claim 1, wherein displaying a representation of each corresponding different network destination comprises displaying connectivity status for at least one network destination.

8. The method of claim 1, wherein automatically selecting a particular network connection from the first combination of network connections, and connecting to the first network destination using the particular network connection comprises automatically disconnecting from an already connected network connection.

9. The method of claim 1, further comprising, modifying the graphical user interface to display a representation of a subset of the corresponding different network destinations.

10. The method of claim 1, further comprising, displaying information about a network destination when a pointer hovers over that network destination.

11. A physical storage device having stored thereon computer-executable instructions, which when executed perform steps for grouping a plurality of different types of network connections by destination within a graphical user interface, comprising:

identifying a plurality of network profiles, each network profile including (i) an identification of a corresponding different network destination and (ii) a specification of one or more network connections that can be used to connect to the corresponding different network destination, the plurality of network profiles including:

a first network profile that includes (i) an identification of a first network destination, and (ii) a specification of a first combination of network connections that can be used to connect to the first network destination, wherein the first combination of network connections includes a first combination of one or more wireless network connections and one or more wired network connections; and a second network profile that includes (i) an identification of a second network destination, and (ii) a specification of a second combination of a plurality of different types of network connections that can be used to connect to the second network destination, wherein the second combination of network connections includes a second combination of one or more wireless network connections and one or more wired network connections;

determining which of the plurality of network destinations are currently available for connection, including (i) determining that the first network destination is available for connection based on at least one network connection of the first combination network connections being available, and (ii) determining that the second network destination is unavailable for connection based on no network connection of the second combination network connections being available;

displaying a common graphical user interface for grouping a plurality of different types of network connections by destination, including displaying a representation of each corresponding different network destination, while also displaying a status for each corresponding different network destination, including displaying an available status of the first network destination and concurrently displaying an unavailable status of the second network destination;

receiving user input at the common graphical user interface selecting the first network destination; and based on the user input, automatically selecting a particular network connection from the first combination of network connections, and connecting to the first network destination using the particular network connection.

12. The physical storage device of claim 11, wherein displaying a representation of each corresponding different network destination comprises displaying each representation in an order that is based upon ordering rules, including displaying any connected network destination before any non-connected available network destination.

13. The physical storage device of claim 12, further comprising deciding at least part of the order at a media manager level according to the ordering rules.

14. The physical storage device of claim 11, wherein displaying a representation of each corresponding different network destination comprises displaying a network name and/or a user-friendly name for each network destination.

15. The physical storage device of claim 11, wherein displaying a representation of each corresponding different network destination comprises displaying security-related information for at least one network destination.

16. The physical storage device of claim 11, wherein displaying a representation of each corresponding different network destination comprises displaying wireless signal strength information in connection with a least at least one network destination.

17. The physical storage device of claim 11, wherein displaying a representation of each corresponding different network destination comprises displaying connectivity status for at least one network destination.

18. The physical storage device of claim 11, wherein automatically selecting a particular network connection from the first combination of network connections, and connecting to the first network destination using the particular network connection comprises automatically disconnecting from an already connected network connection.

19. The physical storage device of claim 11, further comprising, modifying the graphical user interface to display a representation of a subset of the corresponding different network destinations.

20. A computer system, comprising:

one or more processors; and one or more computer-readable media having stored thereon computer-executable instructions, which when executed by the one or more processors, perform steps for grouping a plurality of different types of network connections by destination within a graphical user interface, comprising:

identifying a plurality of network profiles, each network profile including (i) an identification of a corresponding different network destination and (ii) a specification of one or more network connections that can be used to connect to the corresponding different network destination, the plurality of network profiles including:

a first network profile that includes (i) an identification of a first network destination, and (ii) a specification of a first combination of network connections that can be used to connect to the first network destination, wherein the first combination of network connections includes a first combination of one or more wireless network connections and one or more wired network connections; and a second network profile that includes (i) an identification of a second network destination, and (ii) a specification of a second combination of a plurality of different types of network connections that can be used to connect to the second network destination, wherein the second combination of network connections includes a second combination of one or more wireless network connections and one or more wired network connections;

determining which of the plurality of network destinations are currently available for connection, including (i) determining that the first network destination is available for connection based on at least one network connection of the first combination network connections being available, and (ii) determining that the second network destination is unavailable for connection based on no network connection of the second combination network connections being available;

displaying a common graphical user interface for grouping a plurality of different types of network connections by destination, including displaying a representation of each corresponding different network destination, while also displaying a status for each corresponding different network destination, including displaying an available status of the first network destination and concurrently displaying an unavailable status of the second network destination;

receiving user input at the common graphical user interface selecting the first network destination; and based on the user input, automatically selecting a particular network connection from the first combination of network connections, and connecting to the first network destination using the particular network connection.

* * * * *